United States Patent [19]

Hododi

[11] Patent Number: 5,502,088

[45] Date of Patent: Mar. 26, 1996

[54] WOOD SUBSTITUTE BASED ON LIGNOCELLULOSIC AND INORGANIC MATERIALS, METHOD FOR OBTAINING THE SAME AND USE

[76] Inventor: Andrei Hododi, Calea Serban Voda No. 270, bloc 14, sc.B, et 6, sector 4, R-75207 Bucharest, Romania

[21] Appl. No.: 244,692

[22] PCT Filed: Dec. 8, 1992

[86] PCT No.: PCT/RO92/00008

§ 371 Date: Jun. 6, 1994

§ 102(e) Date: Jun. 6, 1994

[87] PCT Pub. No.: WO93/12179

PCT Pub. Date: Jun. 24, 1993

[30] Foreign Application Priority Data

Dec. 18, 1991 [RO] Romania .................. 148968

[51] Int. Cl.[6] .................. C08J 3/00; C08K 3/34; C08L 95/00; C08H 5/04
[52] U.S. Cl. .................. 524/34; 428/326; 428/327; 428/404; 428/407; 428/490; 428/526; 428/528; 524/13; 524/14; 524/15; 524/16; 524/59; 524/425; 524/443; 527/103; 527/105; 527/400
[58] Field of Search .................. 428/326, 327, 428/404, 407, 490, 526, 528; 524/13, 14, 15, 16, 34, 59, 425, 443; 527/103, 105, 400

[56] References Cited

U.S. PATENT DOCUMENTS

| | | | |
|---|---|---|---|
| 2,502,498 | 4/1950 | Williamson et al. | 260/17.2 |
| 4,434,261 | 2/1984 | Brugel et al. | 524/15 |
| 4,480,061 | 10/1984 | Coughlin et al. | 524/15 |

FOREIGN PATENT DOCUMENTS

| | | |
|---|---|---|
| 2385523 | 10/1978 | France . |
| 944686 | 6/1956 | Germany . |
| 870034418 | 2/1987 | Japan . |
| 1395105 | 5/1975 | United Kingdom . |

*Primary Examiner*—Paul R. Michl
*Assistant Examiner*—Patrick Niland
*Attorney, Agent, or Firm*—Herbert Dubno; Jonathan Myers

[57] ABSTRACT

This invention refers to a wood substitute with lignocellulosic and mineral material particles which are molded in sheet, e.g. plates and/or panels in different thicknesses or forms in stencil at choice, using in principal natural and artificial, and vegetal cellulosic material components, e.g. dried leaves, sawdust, rotten wood particles splinters, paper-wastes, roots and mineral materials as limestone from sulphates type carbonates or calcium oxides, with synthetic binders from different chemical structures, with or without dyes, in these proportions: 35–60 by weight lignocellulosic components particles, 5–35 by weight limestone types, 5–30 by weight synthetic binders from different harmless chemical structures, with or without synthetic dyes from varied chemical structures and with or without requested additions.

8 Claims, No Drawings

1

WOOD SUBSTITUTE BASED ON LIGNOCELLULOSIC AND INORGANIC MATERIALS, METHOD FOR OBTAINING THE SAME AND USE

TECHNICAL FIELD

The invention relates to a woodsubstitute with lignocellulosic material and mineral particles which are moulded in sheets such as plates or panels of varied thicknesses in diverse forms. The components of the wood substitute may include vegetables and cellulosics such as splinters, woodchips, sawdust and/or woodwool, dried leaves, paperwastes, cereal chaff, aquatic plants etc. with a binder. The invention also relates to a process for preparing the wood substitute.

BACKGROUND OF THE INVENTION

A wood substitute is disclosed in Romanian Patent 37832, which consists of a mixture composed of 500 kg/m$^3$ rice chaff with or without mass addition of wood and, 70–80 kg/m$^3$ technical urea, the ratio refering to the rice chaff volume.

The product is prepared by the following steps: the ricechaff is artificially dried to 2% humidity and then non-diluted viscous Urelit C as adhesive is added as well as, ammonium sulphate as accelerator and technical urea as inhibitor and then all the ingredients are mixed in a stirrer, in order to obtain a complete homogenizing. Then the homogeneous mixture is poured as a sheet with 60–80 mm thickness and pressed with a pressing force of between 2–6 kg/cm$^2$ for 15–25 minutes at a temperature between 130°–150° C. in order to finish the polymerization process.

The product and the method to obtain it suffer from the disadvantages of difficult preparation and a limited field of use; the product cannot be moulded in forms in order to obtain finished products.

In accordance with the French Patent 2578187 there is another wood substitute and process to prepare same which has in its composition, resinbark and leaves held together with a mineral binder which assures exclusively the cohesion, in order to obtain this product. The bark is ground or crushed at varied dimensions, then contacted with a mineral binder and a quantity of water which represents the difference between the necessary water quantity for a good setting of the bark used in the process. The mixture of bark, mineral binder and water is obtained through the aid of mechanic equipment then drained before the setting or pressed to obtain plates or panels.

The used mineral binders can be construction plasters, stencil plasters or hydraulic binders such as Portland cement.

This product also suffers the disadvantage of limited physical and mechanical characteristics and a restricted field of use.

Also the Romanian Patent 9262 makes reference to a wood substitute constituted of sawdust or splinters or a mixture of both these materials, with a possible addition of a fibrous material, preferably peat, which are mixed with approximately 3–10% setting material which consists of albumin, preferably bloodalbumin, limestone and soluble glass to which is added a necessary water quatity, then the mixture is pressed at a pressure of over 100 atmospheres, at a temperature of 110° C. In order to obtain the wood substitute, in accordance with this patent, approximately 450 kg sawdust or splinters are mixed with 12–20 kg bloodalbumin, 3–6 kg limestone, 3–6 kg soluble glass and 30–40 kg water, the obtained mixture being pressed at 140–150 atm a temperature of 110° C. into flat forms.

This product suffers from the disadvantage of limited physical and mechanical properties, the impossibility to be moulded in profiled forms in order to obtain final products and the required use of a setting material such as bloodalbumin which is a shortcoming affecting the product.

OBJECT OF THE INVENTION

The object of the invention is to obtain wood substitute from raw cellulosic materials (ligno-cellulosic) with great diversity and with physical and mechanical properties superior to those of natural wood.

SUMMARY OF THE INVENTION

In accordance with this invention the problem is solved in that the wood substitute includes in the mixture as a vegetal component tree leaf particles, sawdust, rotten wood particles, splinters, paperwastes, roots, forage cultures, cereal crops, sorghum wastes, bark, stems, etc., included as mineral component, limestone in sulphate form, carbonates, calcium oxides, and a synthetic binder component of varied chemical structure with or without dyes, which proportions are included between 35–60 by weight wooden or cellulosic particles, 5–35 by weight limestone particles and between 5–30 by weight synthetic binders of varied harmless chemical structures with or without other additions as required by necessity.

The method for producing this woodsubstitute consists, in the first phase, in drying the ligno-cellulosic materials, irrespective of their nature and dimensions. The dried material is then reduced to equal dimensions through hashing, grinding and disintegration under pressure, the obtained particles are then mixed in a ratio of 35–60 by weight ligno-cellulosic particles, 5–35 by weight limestone particles and 5–30 by weight synthetic binders of varied chemical structure with or without other additions, over 10–40 minutes at a temperature between 5°–30° C. until homogenized, obtaining a paste of honeyviscosity, which is then moulded in flat or different other forms according to the final use, followed by a drying operation in a closed space at a temperature between 5°– 50° C. over 10–30 days, the humidity in the closed space being a maximum 8% during the whole drying process.

Through the use of this woodsubstitute, in accordance with the invention, a number of products are obtained leading to the reduction of cost price, the wood substitute is obtained with minimum effort and does not require special endowments, possesses higher physical and mechanical properties then the natural wood and every other known wood substitute. It can be moulded in various forms, irrespective of the profiled surface. The obtained wood substitute sheet can support subsequent workings, varying with the necessities and strain forces, and possesses a chemical stability and a lasting homogeneity of the material.

DETAILED DESCRIPTION OF THE INVENTION

The following examples will describe illustrative, but not limited ways of the manufacturing of this woodsubstitute according to the invention.

First example to obtain this wood substitute from wooden and cellulosic raw material, a mixture of dried leaves and sawdust (the ratio between the components varying from 50:50% to 17:83%) in proportion of 35 parts by weight are used; the dried leaves are broken in a chopper until particles with dimensions between 2 μm and 5 cm, are obtained particles which are selected through a sieving-process, then sawdust is added and 10 parts by weight water. Then homogenizing by mixing for 10 minutes with 15 parts by weight limestone particles such as calcium carbonate ($CaCO_3$) is carried out at a temperature of 25° C. then 30 parts by weight synthetic binder such as polymacromolecular type and its esters or polyformaldehydes are added, for instance polyvinylacetate

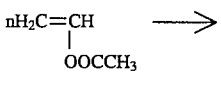

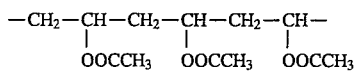

and or polyoxymethylen (α and β)

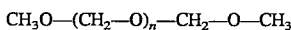

and 10 parts by weight fireproofing products of varied types of the silicate class, preferably hydrated sodiumsilicate or magnesium or organic condensation products such as anhydride chlorinated esters type, continuing the homogenizing for another 20 minutes until a honeyviscosity paste is obtained α-Polyoxymethylene is a mixture of hydrated polymers similar to paraformaldehyde but having a higher degree of polymerisation, the values of n in the formula $(CH_2O)_nH_2O$ being 100 or over. β-polyoxymethylene is similar to the above mentioned polymer of formaldehyde but has probably a higher degree of polymerization. It is produced by treating 10 volumes of 40% formaldehyde with 4 volumes of concentrated sulfuric acid. The polymer always contains a small amount of sulfuric acid not removed by water washing and probably combined in the form of sulfuric acid derivatives of the higher polymethyleneglycols.

The material thus obtained is moulded in the form of varied profiles, thicknesses and dimensions according to the use of the finished product. Some forms are submitted to a drying process in a closed precinct at a temperature between 5°–50° C., preferably 35° C. in an atmosphere with 8% maximum humidity over 10–30 days, varying with the physical and mechanical characteristics required by the product.

Second example. A mixture composed of rottenwood, bark and paperwastes (the ratio of the components varying between 17:50:33; 50:17:33 or 50:33:17) is prepared in proportion of 35–60 parts by weight which are disintegrated under pressure after a preliminary treatment in order to destroy possible microorganisms. Particles are obtained with dimensions between 5 μm and 3 cm, the particles are then homogenized by mixing with 10 to 15 parts by weight water, for 40 minutes together with 5–35 parts by weight limestone particles such as calcium carbonate ($CaCO_3$) to which is added 5–30 parts by weight synthetic binder such as melamine type or the phenolformaldehyde Novolac type,

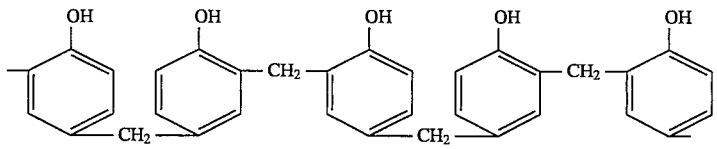

(and 5–15 parts by weight fireproof products and thermoinsulators.) of varying types, for instance bitumen foam and blast furnace cinders under a temperature of 30° C. until a honeyviscosity paste is obtained.

The paste thus obtained is moulded in flat forms or various profiles and submitted to drying at a temperature between 5°–50° C., preferably 45° C. in an atmosphere with 8% maximum humidity. The flat forms can be subjected to pressing to obtain plates of varied thicknesses (between 5–60 mm) and dimensions in accordance with the form size.

Third example. A mixture composed of growing forage wastes, sorghum wastes, stemplants (the ratio of the components varying between 10:30:60; 60:10:30 or 30:60:10) in a proportion of 35–60 parts by weight is ground and brought to equal dimensions between 1–4 cm. Then 5–15 parts by weight water, 5–35 parts by weight limestone particles such as sulphate ($CaSO_4$) or calcium carbonate ($CaCO_3$) are added. Then it 5–30 parts by weight synthetic binder of polystyreric resins type, and boneglue are added then the mixture is homogenized by mixing for 35 minutes at a temperature of 25° C. Then it adds 5–15 parts by weight fireproof products, antiphonals or thermalinsulators such as bitumen foams, blast furnace cinders and thermal power station ash are added and the homogenizing process is continued for another 15 minutes until a honeyviscosity paste is obtained.

The paste thus obtained is moulded in flat or varied profiled forms being submitted to a drying at a temperature between 5°–50° C., preferably 50° C. in at atmosphere with 8% maximum humidity, in an interval of 10 to 30 days.

The flat forms can be submitted to pressing in order to obtain plates of varied thicknesses between 5–60 mm and varied dimensions according to the sizeform.

The products thus obtained can have the following physical and mechanical characteristics:

Specific weight varying with the necessities between 0.2–2 kg/dm$^3$

Static bending strength: 200–2200 daN/cm$^2$

Modulus of elasticity: 400–150.00 kgf/cm$^2$

Heat resistance:
  weight loss ≦2 g
  carbonized surface ≦10 cm

Water absorption after 24 hours of immersion % max: 0.3–12%

Acoustic absorption:
  as insulator: 13–>18
  as acoustic insulator: 34–>43

I claim:

1. A wood-substitute composition which consists essentially of:
   (a) 35 to 60 parts by weight of lignocellulosic particles;
   (b) 5 to 35 parts by weight of limestone;
   (c) 5 to 30 parts by weight of a synthetic binder resin selected from the group consisting of polyvinylacetate, polyoxymethylene, melamine-formaldehyde, and polystyrene; and (d) 5 to 15 parts by weight of each of the following: a bitumen foam as a fireproofing agent, blast furnace cinders as a thermoinsulator, and thermopower station ash as an anti-phonal agent.

2. A process for the preparation of a wood-substitute which consists essentially of:

(a) 35 to 60 parts by weight of lignocellulosic particles;

(b) 5 to 35 parts by weight of limestone;

(c) 5 to 30 parts by weight of a synthetic binder resin selected from the group consisting of polyvinylacetate, polyoxymethylene, melamine-formaldehyde, and polystyrene; and (d) 5 to 15 parts by weight of each of the following: a bitumen foam as a fireproofing agent, blast furnace cinders as a thermoinsulator, and thermopower station ash as an anti-phonal agent, which comprises the steps of:

(i) chopping and grinding under pressure a mixture of dried vegetal matter and sawdust to form the lignocellulosic particles;

(ii) mixing the lignocellulosic particles with water, the limestone particles, and the synthetic binder resin, to form a mixture and homogenizing the mixture at 5° to 30° C.;

(iii) adding the bitumen foam, the blast furnace cinders and the thermopower station ash to the mixture formed in step (ii) and continuing the homogenizing to form a paste with the viscosity of honey;

(iv) molding the paste with the viscosity of honey into a sheet; and (v) drying the sheet at a temperature of 5° to 50° C. in a closed space having a maximum humidity of 8%.

3. A wood-substitute composition which consists essentially of:

(a) 35 to 60 parts by weight of lignocellulosic particles which are forage waste, sorghum waste, and plant stems in a weight ratio ranging from 10:30:60 to 60:10:30 to 30:60:10 or rotten wood, bark and paper waste in a weight ratio of 17:50:33 to 50:17:33 to 50:33:17;

(b) 5 to 35 parts by weight of limestone;

(c) 5 to 30 parts by weight of a synthetic binder resin selected from the group consisting of phenol-formaldehyde, polyvinylacetate, polyoxymethylene, melamine-formaldehyde, and polystyrene; and (d) 5 to 15 parts by weight of each of the following: a bitumen foam as a fireproofing agent, blast furnace cinders as a thermoinsulator, and thermopower station ash as an anti-phonal agent.

4. A process for the preparation of a wood-substitute which consists essentially of:

(a) 35 to 60 parts by weight of lignocellulosic particles which are forage waste, sorghum waste, and plant stems in a weight ratio ranging from 10:30:60 to 60:10:30 to 30:60:10 or rotten wood, bark and paper waste in a weight ratio of 17:50:33 to 50:17:33 to 50:33:17;

(b) 5 to 35 parts by weight of limestone;

(c) 5 to 30 parts by weight of a synthetic binder resin selected from the group consisting of phenol-formaldehyde, polyvinylacetate, polyoxymethylene, melamine-formaldehyde, and polystyrene; and (d) 5 to 15 parts by weight of each of the following: a bitumen foam as a fireproofing agent, blast furnace cinders as a thermoinsulator, and thermopower station ash as an anti-phonal agent, which comprises the steps of:

(i) grinding under pressure and disintegrating a mixture of the forage waste, sorghum waste and plant stems to form lignocellulosic particles, or (ia) treating a mixture of the rotten wood, bark and paper waste to destroy any microorganisms therein and grinding under pressure and disintegrating the mixture to form lignocellulosic particles;

(ii) mixing the lignocellulosic particles formed in step (i) or (ia) with water, the limestone particles, and the synthetic binder resin, to form a mixture and homogenizing the mixture at 5° to 30° C.;

(iii) adding the bitumen foam, the blast furnace cinders and the thermopower station ash to the mixture formed in step (ii) and continuing the homogenizing to form a paste with the viscosity of honey;

(iv) molding the paste with the viscosity of honey into a sheet; and (v) drying the sheet at a temperature of 5° to 50° C. in a closed space having a maximum humidity of 8%.

5. The wood-substitute composition prepared by the process defined in claim 3.

6. The wood-substitute composition prepared by the process defined in claim 4.

7. The wood-substitute composition defined in claim 1 wherein the synthetic binder resin is alpha-polyoxymethylene or beta-polyoxymethylene.

8. The wood-substitute composition defined in claim 3 wherein the synthetic binder resin is alpha-polyoxymethylene or beta-polyoxymethylene.

* * * * *